Patented Aug. 8, 1933

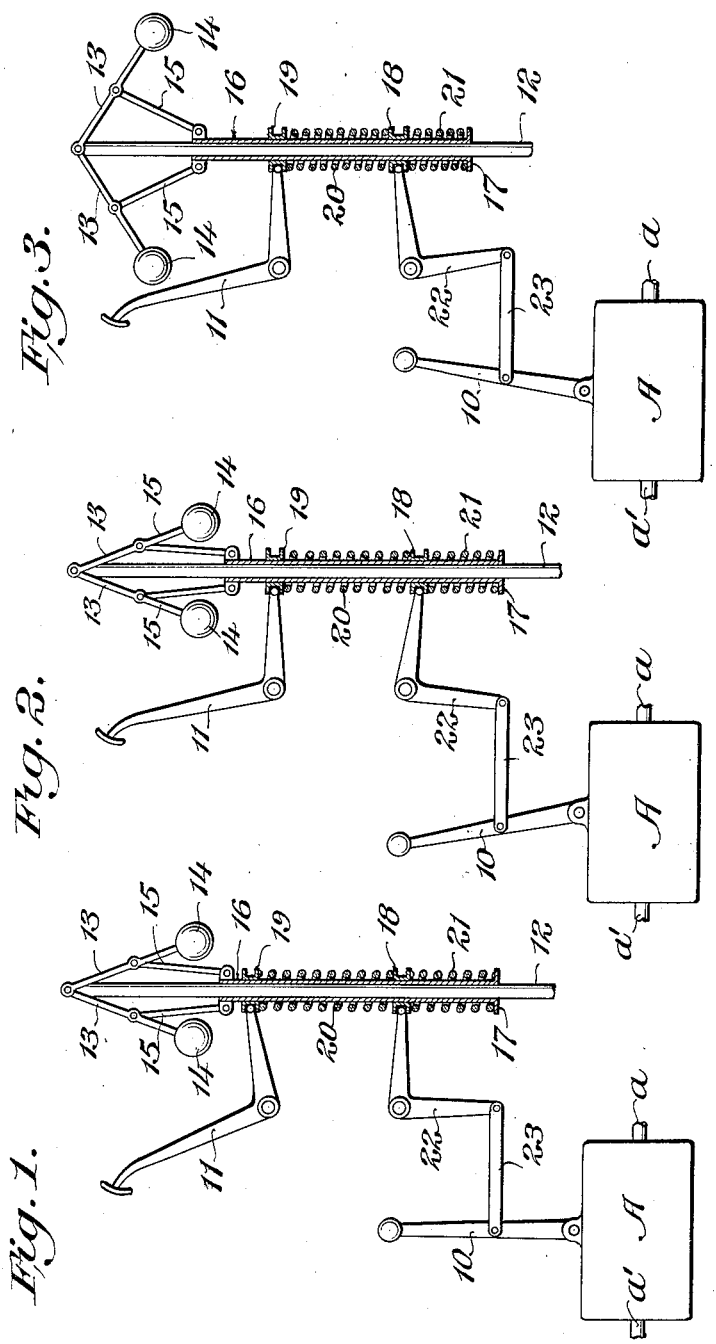

1,921,459

UNITED STATES PATENT OFFICE 1,921,459

CONTROL MECHANISM FOR POWER TRANSMISSION GEARS

Richard Erban, Vienna, Austria, assignor to Erban Patents Corporation, a Corporation of New York Application December 8, 1930, Serial No. 500,693, and in Austria January 9, 1929

4 Claims. (Cl. 74—107)

My present invention relates to a control mechanism for power transmission gears of the type in which the gear ratio of the transmission gear is capable of being continuously varied between the lowest speed gear ratio and a one-to-one ratio or direct drive, and my object, generally speaking, is to provide a practical control mechanism which is operable in response to variations in the speed of rotation of the driving or the driven element of the gear to automatically vary the gear ratio of the gear.

The mechanism constituting my invention is particularly adapted for use with power transmission gears of the type mentioned in installations where the power which is transmitted through the gear is derived from an internal combustion engine, steam engine or the like, which is inclusive of a movable throttle element for controlling the speed thereof, and in this connection it is my further object to provide a transmission gear control mechanism having a connection with the throttle element whereby throttle opening movement of the throttle element effects a change in the transmission gear toward a low speed ratio, and whereby the increased speed of the engine resulting from opening of the throttle automatically effects a variation in the gear ratio of the transmission gear toward direct drive. Also, in this connection, it is my further object to provide a control mechanism which will operate automatically to effect a variation or change in the gear ratio of the transmission gear toward a low speed gear ratio if the speed of the engine decreases, as, for example, when an increased load is imposed thereon, irrespective of movement of the throttle element.

Further, it is my object to provide an automatic control mechanism of the character stated which is of relatively simple, inexpensive construction, and which is positive in its action and thoroughly reliable and efficient in operation.

With the foregoing and other objects in view, which will become more fully apparent as the nature of my invention is better understood, the same consists in the novel features of construction, combination and arrangement of parts hereinafter more fully described, as will be illustrated in the accompanying drawing and defined in the appended claims.

In the drawing, wherein like characters of reference denote corresponding parts in the different views:

Figure 1 is a diagrammatic side elevation of my automatic control mechanism illustrating the parts thereof in their normal position.

Figure 2 is a view similar to Figure 1 illustrating the status of my mechanism when the throttle element is moved in a throttle opening direction and prior to actuation of the mechanism by the increase in the speed of the engine due to opening of the throttle; and Figure 3 is a view similar to Figures 1 and 2 illustrating the status of the mechanism following increase in the speed of the engine.

Since my present automatic control mechanism is adapted for use with practically any transmission gear of the type in which the gear ratio may be continuously varied between the lowest speed gear ratio and a one-to-one ratio or direct drive, no attempt has been made to illustrate any specific transmission gear of this type, but to the contrary such a gear is illustrated conventionally in the drawing and is designated generally as A, the same being inclusive of driving and driven shafts designated as $a$, $a'$, respectively.

In so far as the present invention is concerned, the only essential of the gear A is that it be inclusive of an element, such as a lever or the like, which is effective in one position to establish a low speed gear ratio of the gear, and in another position to establish a direct drive or a gear into above one-to-one. Accordingly, the gear A is illustrated as being inclusive of such an element, and for convenience said element is indicated as a lever 10.

The engine which furnishes the power that is to be transmitted through the gear A is not illustrated, as it forms no part of the present invention. It is to be understood, however, that the engine is coupled with the driving shaft $a$ of the transmission gear and that the engine is inclusive of a throttle element which is movable to control the engine speed, said throttle element being illustrated in the drawing as a bell-crank lever 11.

My automatic control mechanism which is adapted for connection with the levers 10 and 11 for operating the transmission gear A in the manner heretofore mentioned, consists essentially of a centrifugal governor inclusive in the present instance of a shaft 12 which is adapted for connection in any suitable manner either with the driving shaft $a$ or the driven shaft $a'$ of the transmission gear A for rotation proportionately to the speed of rotation of such shaft.

According to the present embodiment of my invention, the shaft 12 has pivoted thereto a plurality of arms 13 which are weighted at their outer ends, as at 14, and which are connected, by links 15, with a sleeve 16 that is slidably mounted on said shaft 12.

Normally, the weighted arms 13 and the sleeve 16 assume the position shown in Figure 1, either under the influence of gravity or under the influence of a suitable spring or springs, but when the shaft 12 is rotated the arms 13 swing outward due to centrifugal force, with the result that the sleeve 16 is shifted longitudinally along the shaft 12, the relative positions of the arms 13 and the sleeve 16 when the shaft 12 is being rotated at high or maximum speed being indicated in Figure 3 of the drawing.

Fixed with respect to the sleeve 16 is an abutment 17, while slidably mounted on said sleeve is a pair of collars 18 and 19 which have interposed therebetween a coil spring 20, a second coil spring 21 being interposed between the collar 18 and the abutment 17.

One arm of the bell-crank lever 11 is connected with the collar 19, while one arm of a second bell-crank lever 22 is connected with the collar 18, the other arm of said bell-crank lever 22 being connected by a link 23 with the gear shift lever 10.

The normal position of the lever 10 is as shown in Figure 1, establishing a direct drive or a gear ratio above one-to-one between the driving and the driven shafts $a$ and $a'$. Likewise, the normal position of the lever 11 is as shown in Figure 1. That is to say, when the governor arms 13 are in an inoperative position and the sleeve 16 is at its limit of movement along the shaft in a direction corresponding to the inoperative position of the arms 13, the bell-crank lever 11 normally is in a throttle closing position, the arrangement being such, as shown, that throttle opening movement of the throttle element 11 operates through the collar 19 and the spring 20 to shift the collar 18 along the sleeve 16 in a direction to effect, through the bell-crank lever 22 and the link 23, shifting of the lever 10 in a direction to establish a low speed gear ratio of the transmission gear A, while outward swinging movement of the governor arms 13 is effective to shift the sleeve 16 in a direction to effect, through the abutment 17 and the spring 21, shifting of the collar 18 with said sleeve in a direction to impart movement to the lever 10 toward a position establishing a direct drive or a gear ratio above one-to-one in the transmission gear. Accordingly, the operation of the mechanism is as follows: when the throttle element 11 is moved to open the engine throttle, the collar 19 is shifted along the sleeve 16 toward the collar 18 and through the spring 20 effects shifting of the latter collar along said sleeve in a direction to move the lever 10 toward a position to effect a low gear ratio in the gear A, as illustrated in Figure 2 of the drawing. Thus, maximum torque is developed in the driven shaft $a'$ as the engine throttle is opened. On the other hand, as the speed of the engine increases, imparting increased rotary speed to the shafts $a$ and $a'$, and consequently to the governor shaft 12, which is connected with one of said shafts $a$ or $a'$, the governor arms 13 are swung outward, which obviously results in movement of the sleeve 16 in a direction to effect, through the abutment 17 and the spring 21, shifting of the collar 18 in an opposite direction, the lever 10 thereby being moved in a direction to compress the spring 20 and to establish a higher gear ratio in the transmission gear A simultaneously with increase in the engine speed, as illustrated in Figure 3 of the drawing. Thus, it follows that if the speed of the engine is reduced, as, for example, by reason of the driven shaft $a'$ being subjected to an increased load, the arms 13 will move inward with consequent shifting of the sleeve 16 in a direction to permit the spring 20 to expand and shift the collar 18 in a direction to move the lever 10 toward a position establishing a low speed gear ratio in the gear A, whereby the engine is permitted to operate efficiently under the increased load.

In recounting the foregoing operation it is assumed that the throttle element 11 after being moved to a throttle opening position, is maintained in that position, since obviously, if said element is returned or is permitted to return to a throttle closing position, the same operation will take place as occurs when the speed of the engine is decreased while the throttle element is maintained in a throttle opening position.

My automatic control mechanism is adapted for use in various different capacities, but it is especially adapted for use in connection with motor vehicles employing a transmission gear of the type mentioned, the many advantages of said mechanism when so used and operating as described, being apparent in view of the well known adverse conditions under which practically all motor vehicles are operated.

From the foregoing description considered in connection with the accompanying drawing, it is believed that the construction, operation and the advantages of my invention will be clearly understood. It is my desire to point out, however, that while only a single specific embodiment of my invention has herein been shown and described, the same is susceptible to embodiment in various other structures, and the present structure is susceptible of various changes and desirable additions within the spirit and the scope of my invention as defined in the appended claims.

I claim:

1. In combination with a variable speed transmission gear and an engine throttle element, a governor driven from an element of the gear and inclusive of a member reciprocal proportionately to variations in the speed of its driving element, an abutment on said governor member, a pair of collars slidable on said governor member, a spring interposed between said abutment and one of said collars, a second spring interposed between said collars, an operative connection between said first mentioned collar and said gear whereby the gear ratio thereof is varied by movement of said first mentioned collar, and an operative connection between said throttle element and the second mentioned collar whereby the latter is moved toward the first mentioned collar by throttle opening movement of said throttle element.

2. In combination, a variable speed transmission gear, a governor driven in harmony with a driven element of said gear and operable in response to variations in the speed of said element to vary the gear ratio of the gear, an actuator for an engine throttle operable independently of the governor to open and close the throttle, a spring through which the governor operates to increase the gear ratio of the gear, and a second spring disposed to be compressed by movement of the actuator to open the throttle and to resist gear ratio increasing operation of the governor.

3. In combination, a variable speed transmission gear, a governor driven in harmony with a driven element of said gear, an element connected with the gear and movable to vary the gear ratio thereof, a connection between the governor and said element including a spring through which the governor operates to increase the gear ratio of the gear, an actuator for an engine throttle element, and a connection between said actuator and said element including a spring through which the actuator operates when moved in a throttle opening direction to tend to urge said element in a direction to decrease the gear ratio of the gear.

4. In combination, a variable speed transmission gear, a lever connected with the gear and movable to increase and decrease the gear ratio thereof, a governor driven in harmony with an element of the gear, a connection between the governor and said lever including a spring which the governor operates compressively to move said lever to increase the gear ratio of the gear, an actuator for an engine throttle, and a connection between said actuator and said lever including a spring disposed to be compressed by throttle opening movement of said actuator and to resist gear ratio increasing operation of the governor.

RICHARD ERBAN.